(12) United States Patent
Thomasberg

(10) Patent No.: US 7,258,637 B2
(45) Date of Patent: Aug. 21, 2007

(54) BICYCLE TRANSMISSION

(75) Inventor: Paul Thomasberg, Bend, OR (US)

(73) Assignee: Shimano Inc., Osaka (JP)

( * ) Notice: Subject to any disclaimer, the term of this patent is extended or adjusted under 35 U.S.C. 154(b) by 632 days.

(21) Appl. No.: 10/807,267

(22) Filed: Mar. 24, 2004

(65) Prior Publication Data
US 2005/0215367 A1    Sep. 29, 2005

(51) Int. Cl.
B62M 9/14 (2006.01)
B62M 9/10 (2006.01)
F16H 9/06 (2006.01)
F16H 63/02 (2006.01)

(52) U.S. Cl. .................. 474/78; 474/80; 474/160
(58) Field of Classification Search ............ 474/78–82, 474/160; 280/236–238
See application file for complete search history.

(56) References Cited

U.S. PATENT DOCUMENTS

| 881,729 | A |   | 3/1908 | Smith |
|---|---|---|---|---|
| 1,482,682 | A |   | 3/1924 | Liese |
| 1,500,579 | A | * | 7/1924 | Eager ................. 474/903 |
| 1,826,565 | A |   | 10/1931 | Murase |
| 3,769,848 | A |   | 11/1973 | McGuire |
| 5,102,155 | A |   | 4/1992 | Chou |
| 5,873,590 | A |   | 2/1999 | Abe et al. |
| 6,079,726 | A |   | 6/2000 | Busby |

FOREIGN PATENT DOCUMENTS

| CH | 226386 A | | 3/1943 |
|---|---|---|---|
| DE | 4038009 A1 | * | 6/1992 |
| DE | 4129198 A | | 3/1993 |
| EP | 0761529 A1 | | 3/1997 |
| GB | 2338998 A | | 1/2000 |
| RU | 2184673 C2 | * | 7/2002 |
| WO | WO-95-13209 | | 5/1995 |
| WO | WO-98-36960 | | 8/1998 |
| WO | WO-00-68068 A1 | | 11/2000 |
| WO | WO-02/08050 A1 | | 1/2002 |
| WO | WO-03-064242 A1 | | 2/2002 |

* cited by examiner

Primary Examiner—Marcus Charles
(74) Attorney, Agent, or Firm—Global IP Counselors, LLP

(57) ABSTRACT

A bicycle transmission is configured and arranged to improve the durability of the transmission. The transmission basically has a transmission operating device, a support structure, a front input section, an intermediate transmission and a rear output section. The transmission operating device operates the intermediate transmission to change the gear ratio between the front input section and the rear output section. The intermediate transmission has a plurality of drive members arranged to move in the axial direction on an intermediate drive axle in response to its pivotal movement shifting structure. An endless drive member is operatively coupled between a rotatable driving member of the front input section and one of the intermediate drive members. The endless drive member remains substantially in a single plane during shifting of the drive members on the intermediate drive axle.

24 Claims, 7 Drawing Sheets

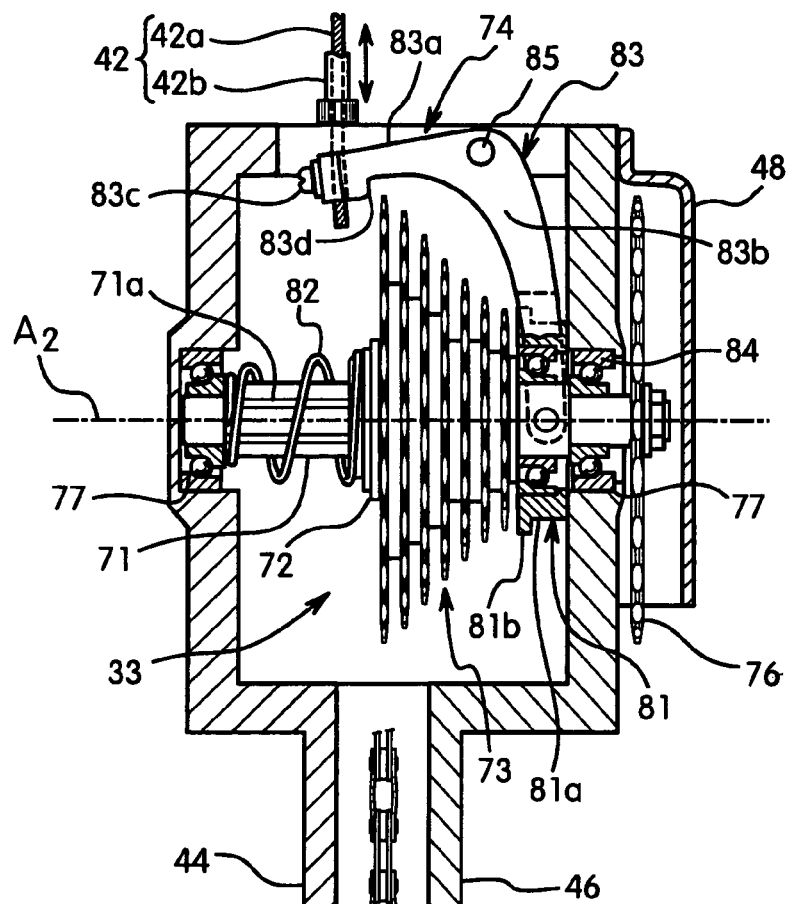
Fig. 5
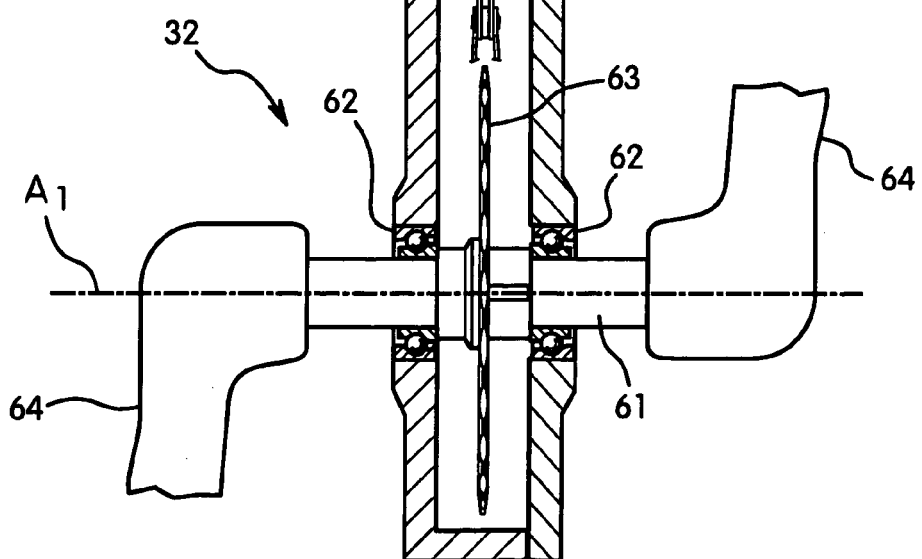

BICYCLE TRANSMISSION

BACKGROUND OF THE INVENTION

1. Field of the Invention

This invention generally relates to a bicycle transmission. More specifically, the present invention relates to a bicycle transmission in which an endless drive member or chain remains substantially in a single plane.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle transmission.

One of the most popular types of bicycle transmissions utilizes a plurality of sprockets mounted on the hub of a rear wheel. A rear derailleur is utilized to shift a chain between adjacent sprockets. The rear derailleur is typically operated by an operating lever or control mechanism that is mounted on the handlebar of the bicycle. Thus, the rider can selectively change gears by operating the operating lever which in turn causes the rear derailleur to shift the chain between various sprockets. This type of transmission is typically also provided with a front derailleur for shifting the chain between a plurality of chain wheels. While these type of typical transmissions work very well, these types of bicycle transmissions require the chain to be pushed or pulled in a transverse direction of the bicycle. In other words, in this type of bicycle transmission, the chain line of the chain never remains constant. Rather, utilizing a derailleur system, the chain must be bent to some degree in either direction which is parallel to the chain pins. Over an extended period of time, this bending of the chain causes the chain to be damaged. Thus, the life span of the chain is reduced.

Moreover, in most conventional bicycle transmissions that utilize a derailleur system, the rear derailleur is located below the rear hub. This exposes the rear derailleur to dirt and debris from the wheel. Thus, the rear derailleur can become excessively dirty and stop shifting properly. Moreover, the location of the rear derailleur is prone to being hit by objects during riding. Also, the rear derailleur is often damaged if the bicycle falls over. Thus, a transmission located at the rear hub has several potential disadvantages.

In addition, the rear wheel is often mounted on a suspension where the rear wheel swings up and down when traveling over rough terrain, such as in the case of a free ride or downhill type bike with eight inches of rear wheel travel. Thus, in these conventional derailleur type transmissions that are at least partially disposed at the rear wheel, these conventional derailleur type transmissions are shaken and swung up and down violently with the rear wheel. This can significantly decrease the operation and durability of the drive train. Further, conventional derailleur type transmission has considerably more unsprung weight than a rear wheel without derailleur type transmission mounted thereto.

In view of the above, it will be apparent to those skilled in the art from this disclosure that there exists a need for an improved bicycle transmission. This invention addresses this need in the art as well as other needs, which will become apparent to those skilled in the art from this disclosure.

SUMMARY OF THE INVENTION

One object of the present invention is to provide a bicycle transmission, which an endless drive member or chain remains substantially in a single plane. Another object of the present invention is to provide a bicycle transmission in which the shifting structure is protected and continuously lubricated.

Still another object of the present invention is to provide a bicycle transmission that is relatively reliable and durable.

The foregoing objects can basically be attained by providing a bicycle transmission comprising an axle, a mount member and a shifting structure. The axle is configured and arranged to rotate about an axis. The mount member is mounted on the axle to rotate together. The mount member is configured and arranged to receive a plurality of drive members operatively coupled to a rotatable driving member with an endless drive member. The shifting structure includes a shifter arm configured and arranged to move the mount member in the axial direction on the axle in response to its pivotal movement to selectively shift the mount member in an axial direction on the axle such that the endless drive member is selectively shifted between the drive members. The shifter arm including an actuated section configured and arranged to be moved in response to a manual operation by a rider of a control mechanism, and an engagement section configured and arranged to move the mount member in the axial direction on the axle.

The foregoing objects can further be attained by providing a bicycle transmission comprising an axle, a plurality of drive members and a shifting structure. The axle is configured and arranged to rotate about an axis. The drive members are mounted on the axle to rotate together, with one of the drive members being operatively coupled to a rotatable driving member with an endless drive member. The shifting structure includes a shifter arm configured and arranged to move the drive members in the axial direction on the axle in response to its pivotal movement to selectively shift the drive members in an axial direction on the axle such that the endless drive member is selectively shifted between the drive members. The shifter arm includes an actuated section configured and arranged to be moved in response to a manual operation by a rider of a control mechanism and an engagement section configured and arranged to move the drive members in the axial direction on the axle.

The foregoing objects can basically be attained by providing a bicycle transmission comprising a rotatable driving member, a rotatable driven member and an intermediate transmission. The rotatable driving member is configured and arranged to rotate about a first axis. The rotatable driven member is configured and arranged to rotate about a second axis. The intermediate transmission is operatively coupled between the rotatable driving member and the rotatable driven member. The intermediate transmission includes an axle, a plurality of intermediate drive members, an endless drive member and a shifting structure. The intermediate drive members are configured and arranged to rotate the axle. The endless drive member is operatively coupled between the rotatable driving member and one of the intermediate drive members. The shifting structure is configured and arranged to shift the intermediate drive members in an axial direction on the axle such that the endless drive member is selectively shifted between the intermediate drive members.

In accordance with another aspect of the present invention, by moving the shifting portion of the transmission of the present invention from the rear of the rear wheel to the main frame, the transmission of the present invention has several advantages over conventional derailleur type transmissions. For example, the transmission is suspended and isolated from front and rear wheel movements. This significantly improves drive train function and durability. Also by removing the shifting mechanism from the rear wheel, the rear wheel can be made stronger and lighter since the cassette sprockets have been eliminated from the rear hub. In particular, by removing the cassette sprockets from the rear hub, this allows the rear hub to be constructed with wider hub flanges and have a zero dish wheel, which is the strongest type. Also this will result in a lighter wheel that reduces "unsprung" weight. Further, since a rear derailleur is eliminated at the rear wheel, this further reduces unsprung weight. Reduction of unsprung weight significantly improves suspension function.

In accordance with another aspect of the present invention, by enclosing the shifting portion of the transmission of the present invention, the transmission of the present invention has several advantages over conventional derailleur type transmissions. In particular, the transmission of the present invention insures positive power transfer regardless of riding conditions. Also the transmission of the present invention improves efficacy and durability because the transmission does not get contaminated with dirt, water etc.

In extreme muddy conditions, the chain of a conventional derailleur type transmission can skip or otherwise become disengaged from the sprockets. Also, in extreme muddy conditions, conventional derailleur type transmissions are often inefficient because of substantial increase in friction between the chain to sprocket interface. This friction is increased as the chain angle increases i.e., cross chain.

In addition, by enclosing the shifting portion of the transmission of the present invention, the casing can be partially filled with an oil splash lubrication that can improve efficiency and durability. Conventional derailleur type transmission cannot continuously lubricate itself.

Furthermore, the transmission casing of the present invention forms a "bash guard" that protects the front chain wheel, similar to a motorcycle where the transmission is fully protected by a "bash plate".

Since the sprockets move as opposed to moving the chain in the present invention, the chain line of transmission is always perfect such that efficiency and durability is improved. In contrast, conventional derailleur type transmissions create a chain angle that reduces efficiency and durability. Also, this transmission makes possible perfect final chain line because there are only two sprockets, i.e., one front sprocket and one rear sprocket.

Another advantage of the present invention is that the transmission of the present invention can be constructed to weigh less than other frame mounted type transmissions and be more efficient. This transmission is more efficient than an "internal gear hub" mounted to the frame.

Another advantage of the present invention is that the transmission of the present invention provides higher ground clearance. Thus, this transmission can be geared higher without lowering ground clearance. In contrast, as the front chain wheel gets larger in a conventional derailleur type transmission, the ground clearance is reduced.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 5 is a simplified partial, enlarged cross sectional view of the bicycle transmission system illustrated in FIGS. 1 and 2 with the intermediate transmission in the low sprocket position and with additional portions removed for purpose of illustration;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
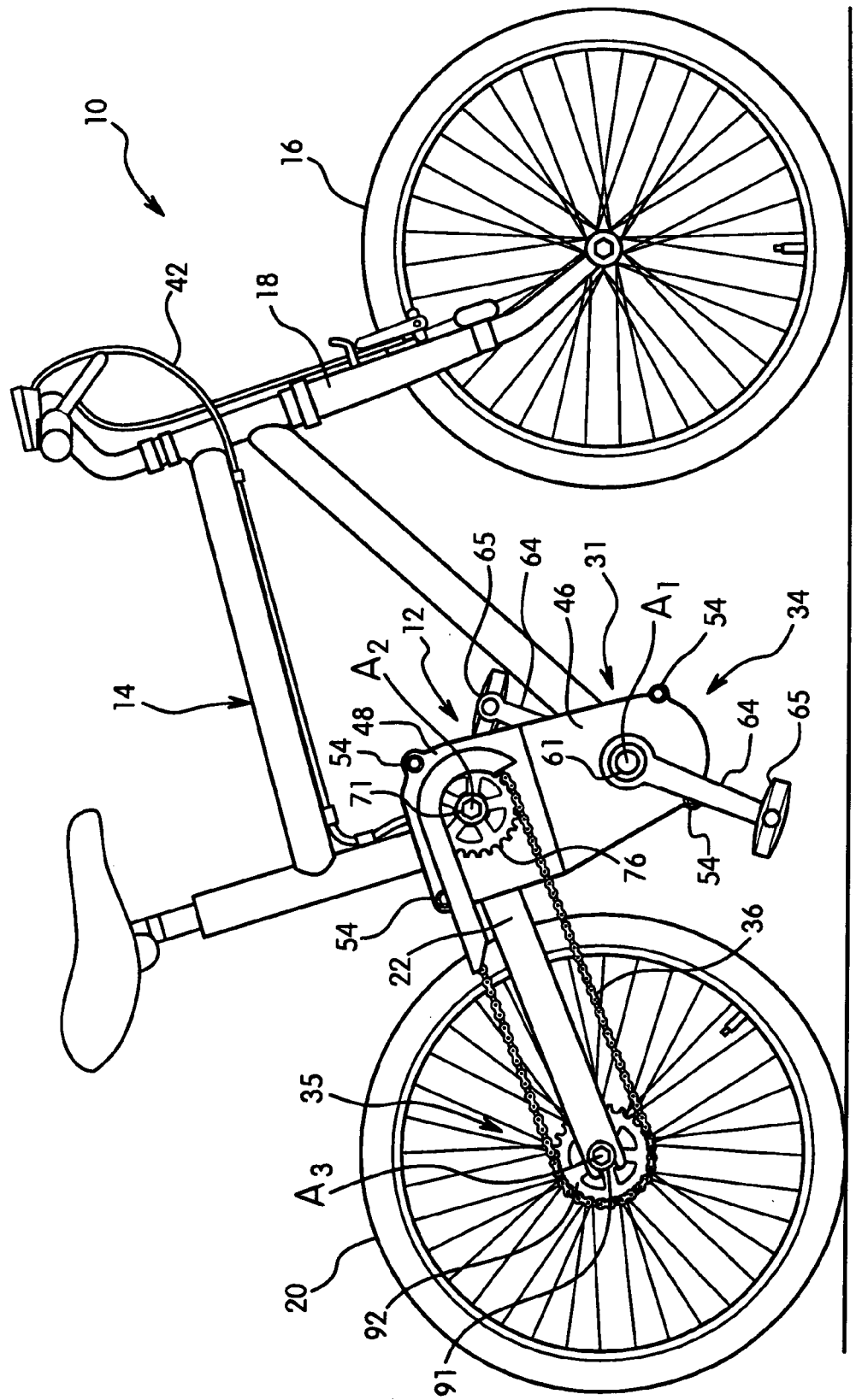
FIG. 1 is a simplified right side elevational view of a bicycle that is equipped with a bicycle transmission system in accordance with a preferred embodiment of the present invention.
Figure 2:
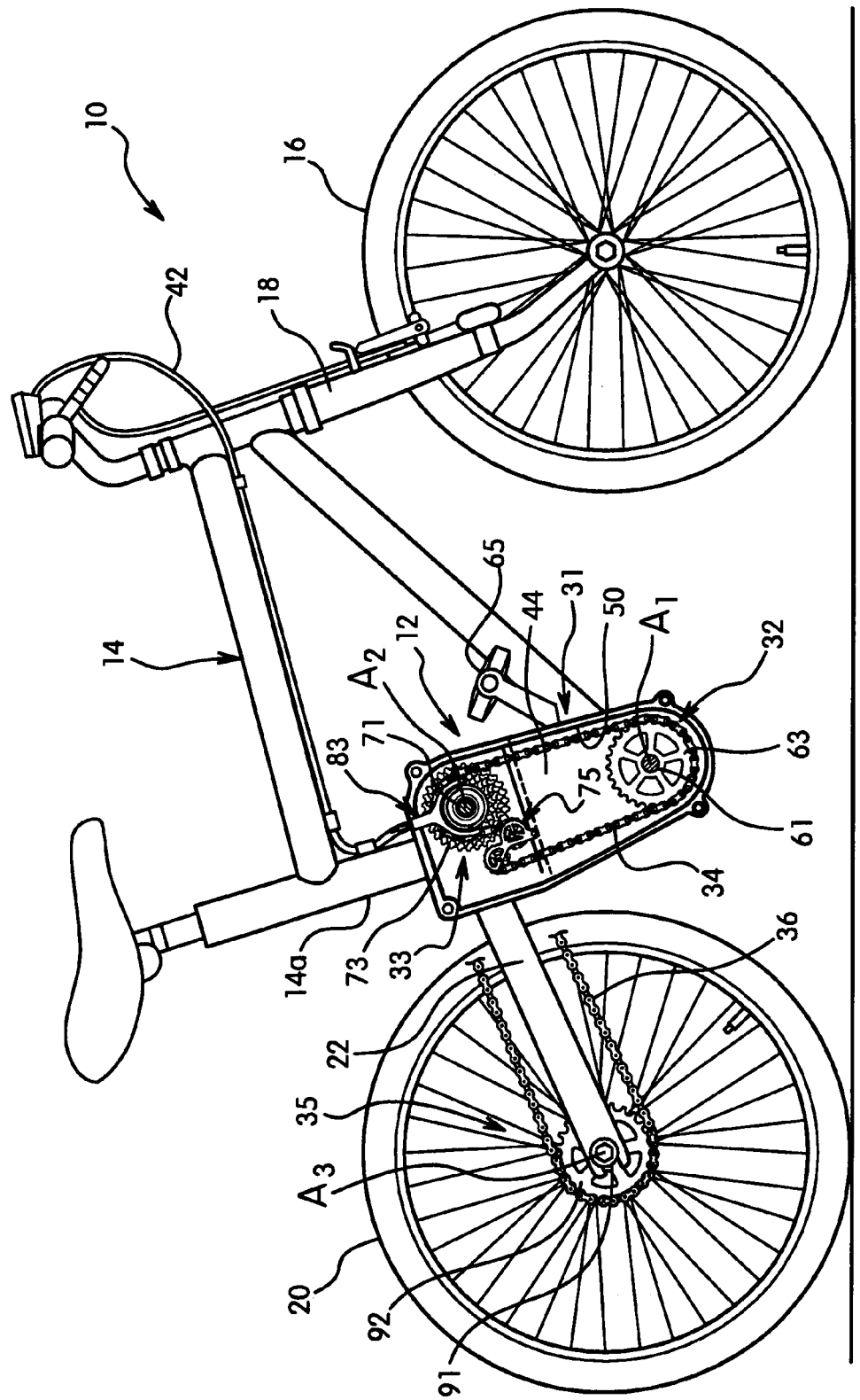
FIG. 2 is a simplified right side elevational view of the bicycle illustrated in FIG. 1 with a portion of the casing of the bicycle transmission system broken away for purposes of illustration.

Referring initially to FIGS. 1 and 2, a bicycle 10 is illustrated that is equipped with a bicycle transmission 12 in accordance with a first embodiment of the present invention. The bicycle 10 further includes a bicycle frame 14 having a front wheel 16 rotatably coupled to the front fork 18 of the frame 14 and a rear wheel 20 rotatably coupled to a rear fork 22 of the frame 14. Since these parts of bicycle 10 are well known in the art, these parts will not be discussed or illustrated in detail herein, except as they are modified to be used in conjunction with the present invention. Moreover, various conventional bicycle parts, which are not illustrated and/or discussed herein, can also be used in conjunction with the present invention.

In the illustrated embodiment, the bicycle transmission 12 forms an integrated part of the bicycle frame 14 or other central structure of the frame 14. In particular, the bicycle transmission 12 forms at least part of the seat tube 14a of the bicycle frame 14. The bicycle transmission 12 basically includes a transmission operating device 30, a support structure 31, an input section 32, an intermediate transmission 33, a first endless drive member or chain 34, an output section 35 and a second endless drive member or chain 36.

Figure 3:
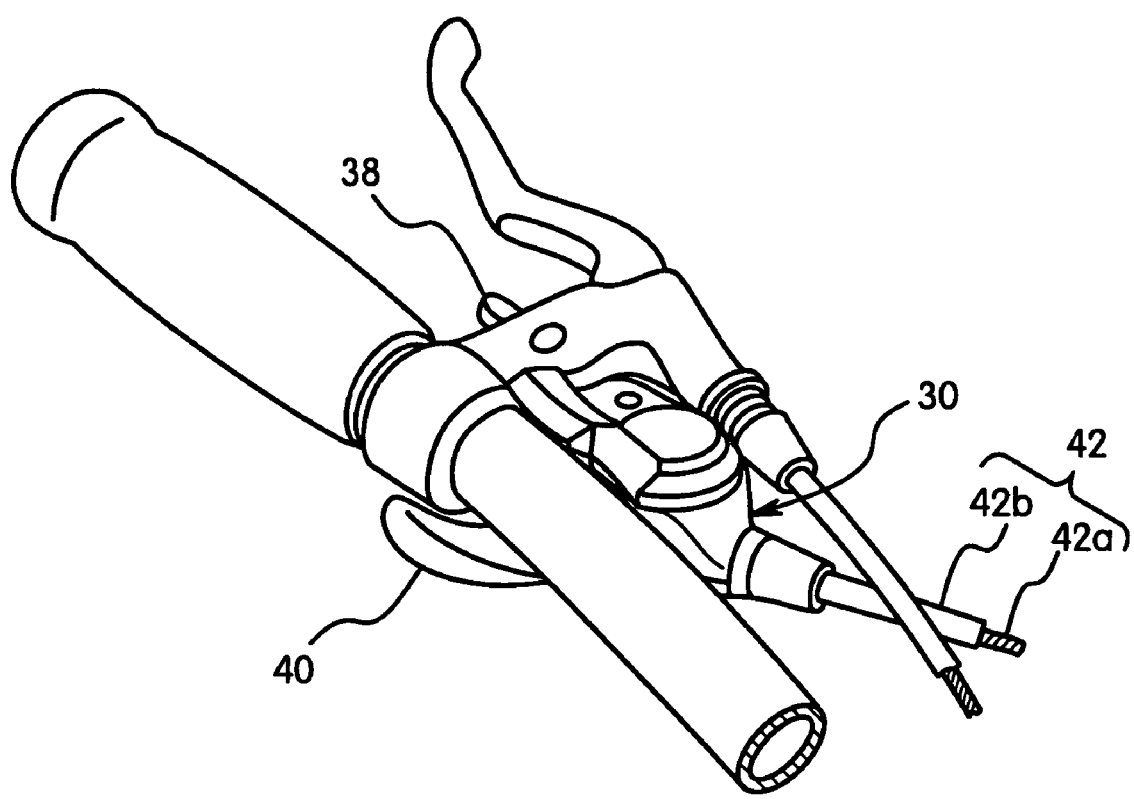
FIG. 3 is a partial, enlarged perspective view of a portion of a handlebar with a shift or transmission operating device that operates the bicycle transmission system illustrated in FIGS. 1 and 2 in accordance with the present invention.

Referring now to FIG. 3, the transmission operating device 30 preferably includes a pair of operating levers 38 and 40 and a shift cable 42 having an inner wire 42a and an outer casing 42b. The operating levers 38 and 40 are preferably part of a relatively conventional shifting device in which the lever 38 releases the inner wire 42a of the shift cable 42 and the lever 40 pulls the inner wire 42a of the shift cable 42 in a conventional manner. Accordingly, the operating levers 38 and 40 will not be discussed or illustrated herein in detail. Likewise, the shift cable 42 is preferably a conventional Bowden cable that has its inner wire 42a connected to a winding mechanism of the transmission operating device 30 in a conventional manner. Thus, the shift cable 42 will not be discussed or illustrated herein in detail. Of course, it will be apparent to those skilled in the art from this disclosure that other types of shift operating devices can be used to carry out the present invention. For example, the illustrated transmission operating device 30 can be replaced with a dual control lever system, a hydraulic system or an electric system as well as other systems that can be used to carry out the present invention.

Figure 6:
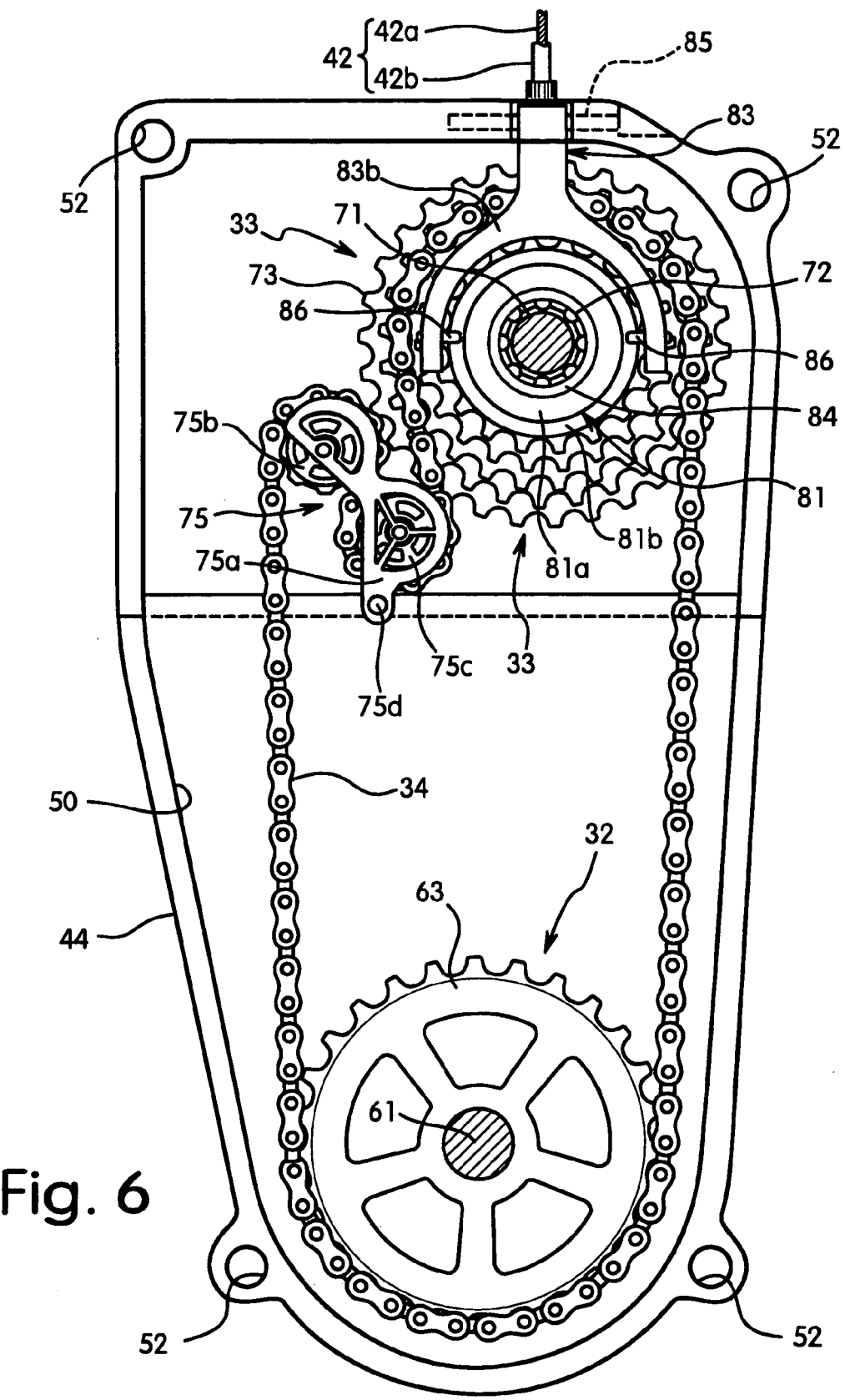
FIG. 6 is a simplified cross sectional view of the intermediate transmission the bicycle transmission illustrated in FIGS. 1 and 2 with the intermediate transmission in the intermediate shift position as viewed from the right side of the bicycle transmission and looking towards the left side of the bicycle.
Figure 7:
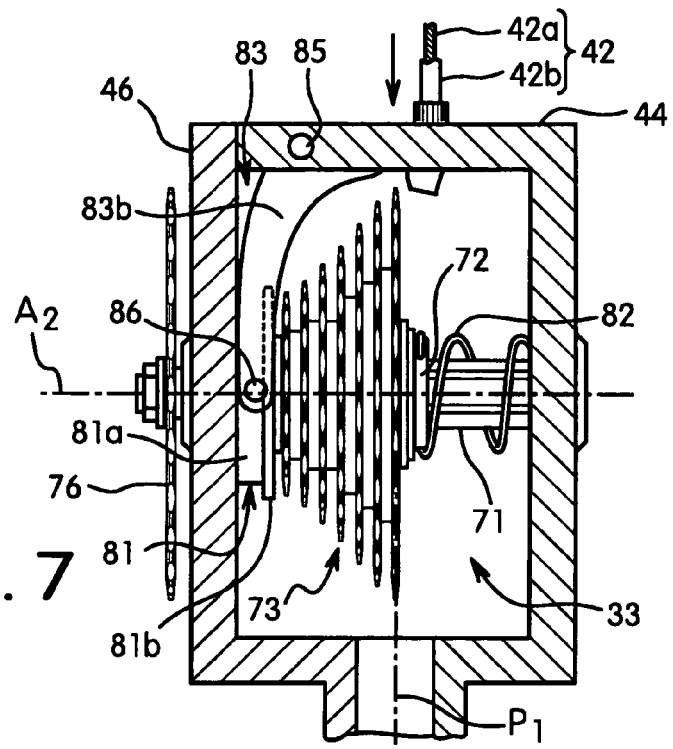
FIG. 7 is a partial, simplified cross sectional view of intermediate transmission the bicycle transmission illustrated in FIGS. 1 and 2 in the low shift position as viewed from the front of the bicycle transmission and looking towards the rear of the bicycle.
Figure 8:
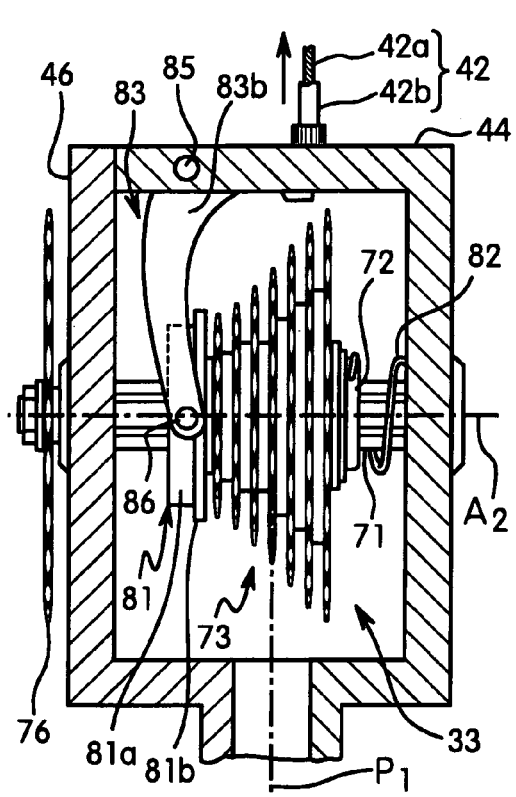
FIG. 8 is a partial, simplified cross sectional view of intermediate transmission the bicycle transmission illustrated in FIGS. 1 and 2 in the intermediate shift position as viewed from the front of the bicycle transmission and looking towards the rear of the bicycle.
Figure 9:
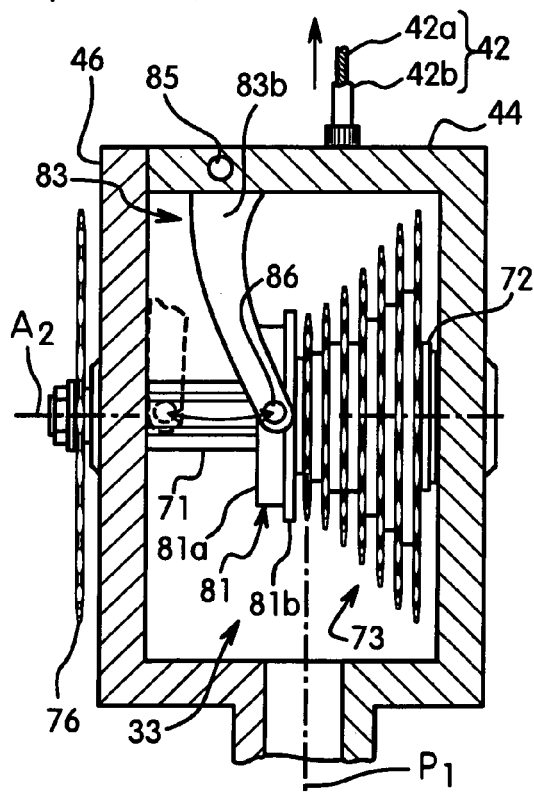
FIG. 9 is a partial, simplified cross sectional view of intermediate transmission the bicycle transmission illustrated in FIGS. 1 and 2 in the top shift position as viewed from the front of the bicycle transmission and looking towards the rear of the bicycle.

Referring now to FIGS. 1, 2 and 4-6, the support structure 31 is preferably constructed of a primary support member 44, a secondary support member 46 and a cover 48. Preferably, the primary support member 44 and the secondary support member 46 are constructed of a rigid material that can be utilized as part of the frame 14 of the bicycle 10. Thus, the primary support member 44 and the secondary support member 46 can be constructed using a variety of conventional bicycle frame manufacturing methods. Moreover, it will be apparent to those skilled in the art from this disclosure that the specific structure of the support structure 31 can be modified depending upon the particular bicycle frame. In the illustrated embodiment, the primary support member 44 forms an enclosure having a side opening 50 that is configured and arranged for receiving the second support member 46 (FIGS. 2 and 6). In particular, the edge of the side opening 50 is provided with several threaded bores 52 (FIG. 6) that receive fasteners 54 (FIG. 1) to secure the secondary support member 46 to the primary support member 44 to close the side opening 50. As seen in FIGS. 1 and 2, the primary support member 44 is also preferably secured between three frame tube sections of the frame 14.

As explained below in more detail, the primary support member 44 and the secondary support member 46 are configured and arranged to support the input section 32 and the intermediate transmission 33 and the first chain 34.

The cover 48 is preferably constructed of a lightweight material and is coupled to the secondary support member 46 in a releasable manner. In the illustrated embodiment, the cover 48 is constructed of a plastic material in which the cover 48 is secured to the secondary support member 46 using two of the fasteners 54.

Turning now to FIGS. 2, 4, 5 and 6, the input section 32 basically includes an input axle 61, a pair of bearings 62, a front chain wheel 63, a pair of crank arms 64 and a pair of pedals 65. The input axle 61 preferably has a rotational axis $A_1$. The bearings 62 rotatably support the input axle 61 to the primary support member 44 and the secondary support member 46 such that the input axle 61 can freely rotate relative to the support structure 31.

The front chain wheel 63 is a rotatable driving member that is configured and arranged to rotate about the rotational axis of the input axle 61. In particular, the front chain wheel 63 is fixedly coupled to the input axle 61 so that the front chain wheel 63 and the input axle 61 rotate together about the rotational axis $A_1$. The front chain wheel 63 is preferably a conventional member having a plurality of teeth that engage the first chain 34 to transmit rotational force to the intermediate transmission 33 as discussed below. Preferably, the front chain wheel 63 is coupled to the input axle 61 to form a "freewheel" type of an arrangement so that the front chain wheel 63 can freely rotate relative to the input axle 61 in the non-drive direction and so that the front chain wheel 63 and the input axle 61 rotate together in the drive direction. Alternatively, this "freewheel" type of arrangement can be formed in the intermediate transmission 33 or in the output section 35 as mentioned below.

The free ends of the input axle 61 have the crank arms 64 fixedly coupled thereto in a conventional manner. The crank arms 64 are arranged to extend in opposite directions from the free ends of the input axle 61. Each of the free ends of the crank arms 64 have one of the pedals 65 rotatably coupled thereto in a conventional manner. Thus, the rider applies a pedaling force to the pedals 65 in order to turn the input axle 61 and the front chain wheel 63 via the crank arms 64.

The intermediate transmission 33 basically includes an intermediate axle 71, a sprocket mounting member 72, a plurality of intermediate drive members 73, a shifting structure 74, a stationary chain tensioner 75, and an intermediate rotatable driven member or chain wheel 76. The intermediate transmission 33 is operatively coupled to the transmission operating device 30 such that operation of the operating levers 38 and 40 cause the intermediate transmission 33 to execute a shifting operation as explained below. The intermediate transmission 33 is driven by the input section 32 via the chain 34. The intermediate transmission 33 is designed to operate such that the chain 34 remains substantially within a single plane $P_1$ that is perpendicular to the rotational axis $A_1$ of the input axle 61 and the rotational axis $A_2$ of the intermediate axle 71.

The intermediate axle 71 is configured and arranged to rotate about the rotational axis $A_2$ which is parallel to the rotational axis $A_1$ of the input axle 61. The intermediate axle 71 is rotatably supported at its ends by the primary and secondary support members 44 and 46 such that the intermediate axle 71 can freely rotate relative thereto. Preferably, conventional bearings 77 are utilized to rotatably support the ends of the intermediate axle 71. The intermediate axle 71 has at least one longitudinal groove 71a for non-rotatable coupling the sprocket mounting member 72 on the intermediate axle 71. Thus, the intermediate axle 71 and the sprocket mounting member 72 rotate together about the rotational axis $A_2$. If needed and/or desired, the connection between the intermediate axle 71 and the sprocket mounting member 72 can be configured and arranged to form a "freewheel" type of an arrangement so that the intermediate drive members 73 can freely rotate relative to intermediate axle 71 in the non-drive direction and so that the intermediate drive members 73 and the intermediate axle 71 rotate together in the drive direction.

The sprocket mounting member 72 is configured and arranged with a central bore that is slideably mounted on the intermediate axle 71 such that the sprocket mounting member 72 can slide in an axial direction along the rotation axis A2. However, the sprocket mounting member 72 is keyed with the intermediate axle 71 such that the sprocket mounting member 72 rotates together with the intermediate axle 71. The outer surface of the sprocket mounting member 72 is configured and arranged to support the drive members 73. In particular, the intermediate drive members 73 are fixedly secured to the sprocket mounting member 72 such that the intermediate drive members 73 rotate with the sprocket mounting member 72 as well as move axially along the intermediate axle 71 with the sprocket mounting member 72.

The intermediate drive members 73 are preferably conventional metal sprockets that are fixedly mounting on the sprocket mounting member 72 in a conventional manner. For example, each of the intermediate drive members 73 has a non-circular central opening that mates with the outer surface of the sprocket mounting member 72. Each of the intermediate drive members 73 is a sprocket having a different diameter with a different number of teeth. The teeth of the intermediate drive members 73 are configured and arranged to engage the first chain 34. Thus, rotation of the front chain wheel 63 causes the first chain 34 to transmit a driving force to the sprocket mounting member 72 via one of the intermediate drive members 73 that is engaged with the chain 34. Rotation of the sprocket mounting member 72 causes the intermediate axle 71 which in turn rotates the intermediate chain wheel 76. Since sprockets such as the ones illustrated in the drawings are well known in the art, the intermediate drive members 73 will not be discussed or illustrated in further detail herein.

The shifting structure 74 is configured and arranged to shift the sprocket mounting member 72 and the intermediate drive members 73 together in an axial direction on the intermediate axle 71 such that the endless drive member 34 is selectively shifted between the intermediate drive members 73. Preferably, the shifting structure 74 includes a collar 81, a biasing member 82 and a shifter arm 83.

The collar 81 is configured and arranged to slide in the axial direction on the intermediate axle 71. Moreover, the collar 81 is preferably rotatably supported on the sprocket mounting member 72 via a bearing 84. Thus, the collar 81 does not rotate with the sprockets or intermediate drive members 73. The collar 81 preferably includes a tubular portion 81a and an annular flange portion 81b. The tubular portion 81a is coupled to the sprocket mounting member 72 by the bearing 84. The annular flange portion 81b extends radially outwardly from the tubular portion 81a. The annular flange portion 81b is configured and arranged such that the shifter arm 83 contacts the flange portion 81b to move the collar 81 along the rotational axis of the intermediate axle 71. This axial movement of the collar 81 by the shifter arm 83 causes the sprocket mounting member 72 and the intermediate drive members 73 to also move in an axial direction.

The biasing member 82 is preferably a compression spring that is mounted on the intermediate axle 71. The biasing member 82 is configured and arranged to urge the sprocket mounting member 72 and the intermediate drive members 73 in the axial direction on the intermediate axle 71 towards one end of the intermediate axle 71. In particular, the biasing member 82 is preferably located on the opposite side of the sprocket mounting member 72 from the collar 81 and the shifter arm 83. The biasing member 82 is arranged such that one end of the biasing member 82 contacts the inner race of the bearing 77 and the other end of the biasing member 82 contacts the sprocket mounting member 72. Thus, the biasing member 82 rotates with the intermediate axle 71. The biasing member 82 is preferably preloaded such that an urging force is always maintained between the sprocket mounting member 72 and the bearing 77 coupled to the primary support member 44 regardless of the location of the sprocket mounting member 72 on the intermediate axle 71. Thus, the biasing member 82 applies an urging force in the axial direction to the sprocket mounting member 72 such that the sprocket mounting member 72 and the intermediate drive members 73 are biased towards the secondary support member 46.

The shifter arm 83 is configured and arranged to move the intermediate drive members 73 in the axial direction on the intermediate axle 71. Specifically, the shifter arm 83 is pivotally mounted about the pivot axis by a pivot pin 85 such that the intermediate drive members 73 are moved in the axial direction on the intermediate axle 71 in response to the pivotal movement of the shifter arm 83. This pivotal movement of the shifter arm 83 causes the collar 81 to push the sprocket mounting member 72 which in turn pushes the intermediate drive members 73 in the axial direction. This axial movement of the intermediate drive members 73 causes the endless drive member or chain 34 to be selectively shifted from one of the intermediate drive members 73 to another one of the intermediate drive members 73. More specifically, the operating levers 38 and 40 are preferably configured and arranged such that each shifting movement of one of the operating levers 38 and 40 results in one shift of the chain from one of the intermediate drive members 73 to the next adjacent drive member. In the illustrated embodiment, the shifter arm 83 is pivotally mounted on a pivot pin to the primary support member 44.

Figure 4:
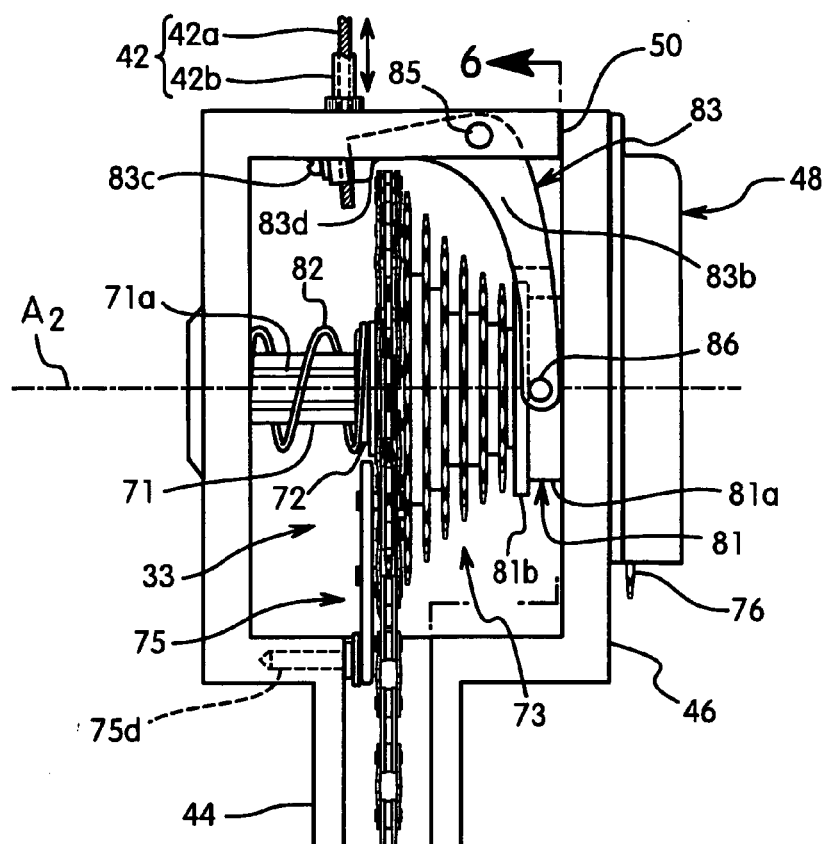
FIG. 4 is a simplified partial, enlarged cross sectional view of the bicycle transmission system illustrated in FIGS. 1 and 2 as viewed from the rear of the bicycle transmission and looking towards the front of the bicycle with the intermediate transmission in the low sprocket position.
Figure 4:
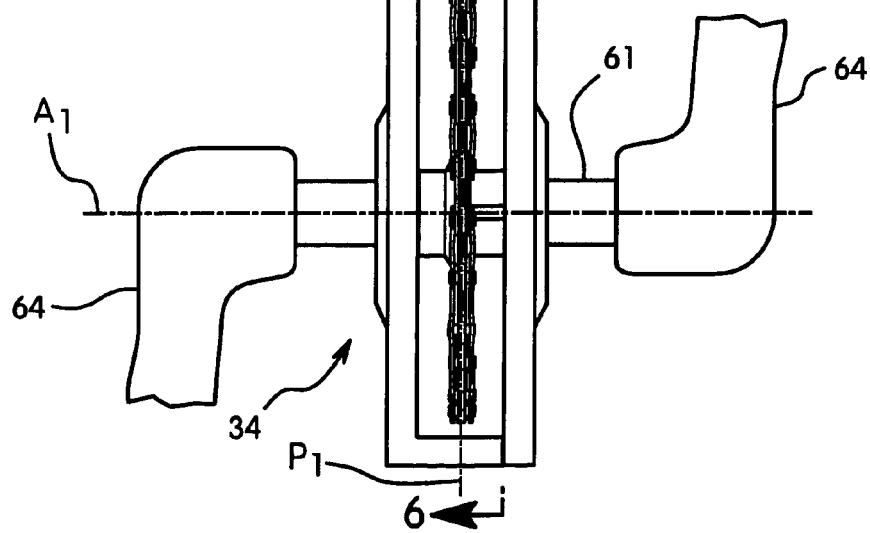

The shifter arm 83 preferably includes an actuated section 83a located on a first side of the pivot pin 85 and an engagement section 83b located on a second side of the pivot pin 85. The actuated section 83a is configured and arranged to be moved in response to the operation of the operating device (control mechanism) 30. In particular, the inner wire 42a of the shift cable 42 is attached to the actuated section 83a by a cable mounting arrangement such as a conventional cable clamp 83c. Accordingly, movement of one of the operating levers 38 and 40 causes the inner wire 42a to be either pulled or released. This pulling or releasing of the inner wire 42a moves the shifter arm 83 such that the shifter arm 83 pivots about the pivot pin 85. The actuated section 83a is further configured and arranged such that the free end of the actuated section 83a forms a chain drop preventing portion 83d. This chain drop preventing portion 83d is configured and arranged to prevent the chain 34 from falling off the largest the intermediate drive members 73 when the intermediate transmission 33 is in the low shift position as seen in FIGS. 4 and 5.

Of course, as mentioned above, it will be apparent to those skilled in the art from this disclosure that other types of shift operating devices can be used to carry out the present invention. In other words, the shifter arm 83 can be moved using other types of shift operating devices such as a hydraulic system or an electric system as well as other shift operating systems that can be used to carry out the present invention. Thus, the present invention is not limited to a cable operated shifting mechanism as illustrated.

The engagement section 83b is configured and arranged to move the intermediate drive members 73 in the axial direction on the intermediate axle 71. In particular, the actuating section is preferably a U-shaped member having a push pin 86 located at each of its free ends. In other words, the engagement section 83b has a pair of arms that straddling the intermediate axle 71 and the collar 81 with the push pins 86 engaging the collar 81. The push pins 86 are configured and arranged to contact the annular flange portion 81b of the collar 81 such that when the shifter arm 83 is pivoted, the push pins 86 move the collar 81 which in turn moves the sprocket mounting member 72 and the intermediate drive members 73 in an axial direction along the intermediate axle 71. The push pins 86 form a contact portion of the shifter arm 83 that is slidably engaged with the collar 81.

The stationary chain tensioner 75 is a conventional tensioner having a support arm 75a with a pair of sprockets 75b and 75c mounted on the support arm 75a for rotation. The support arm 75a is pivotally mounted to the primary support member 44 by a pivot pin 75d to move in a single plane that is perpendicular to the rotational axis $A_2$ of the intermediate axle 71. The support arm 75a is spring biased by a torsion spring (not shown) mounted on the pivot pin 75d with one end of the torsion spring contacting the support arm 75a and the other end of the torsion spring contacting the primary support member 44. In other words, the support arm 75a is spring biased by the torsion spring to apply tension to the chain 34. The chain tensioner 75 pivots about the pivot pin 75d in a first direction to take up slack in the chain 34 as the chain 34 moves from one of the sprockets or intermediate drive members 73 to a smaller one of the sprockets or intermediate drive members 73. The chain tensioner 75 pivots about the pivot pin 75d in a second direction that is opposite to the first direction to provide slack in the chain 34 as the chain 34 moves from one of the sprockets or intermediate drive members 73 to a larger one of the sprockets or intermediate drive members 73. Thus, the chain tensioner 75 maintains tension in the chain 34 regardless of the sprockets or intermediate drive members 73 that is engaged by the chain 34.

The intermediate chain wheel 76 is fixed to the intermediate axle 71 such that rotation of the intermediate axle 71 by the intermediate drive members 73 causes rotation of the intermediate chain wheel 76. Specifically, the intermediate chain wheel 76 is mounted on a portion of the intermediate axle 71 that projects outwardly from the secondary support member 46. The intermediate chain wheel 76 is partially covered by the cover 48. The intermediate chain wheel 76 has a plurality of teeth that engage the secondary chain 36 for transmitting a driving force from the intermediate transmission 43 to the output section 35.

Referring back to FIGS. 1 and 2, the output section 35 preferably includes an output axle 91 and a rotatable driven member or rear sprocket 92. The output axle 91 is the axle of the rear hub of the rear wheel 20. The rear sprocket 92 is fixedly mounted to the rear hub of the rear wheel 20 in a conventional manner. Thus, the rear sprocket 92 is a rotatable driven member that rotates about a rotational axis $A_3$ of the rear wheel 20. The rear sprocket 92 has a plurality of teeth that engage the chain 36 such that movement of the chain 36 by the intermediate transmission 33 causes the rear sprocket 92 to rotate which in turn rotates the rear wheel 20. If needed and/or desired, the connection between the output axle 91 and the rear sprocket 92 can be configured and arranged to form a "freewheel" type of an arrangement so that the rear sprocket 92 can freely rotate relative to output axle 91 in the non-drive direction and so that the rear sprocket 92 and the output axle 91 rotate together in the drive direction.

As used herein, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle transmission comprising:
a support structure;
an axle rotatably supported by the support structure with at least one bearing to rotate about an axis;
a mount member mounted on the axle to rotate together, the mount member being configured and arranged to receive a plurality of drive members operatively coupled to a rotatable driving member with an endless drive member, the mount member being enclosed in the support structure; and
a shifting structure configured and arranged to move the mount member in the axial direction on the axle in response to a manual operation of a rider to selectively shift the mount member in an axial direction on the axle such that the endless drive member is selectively shifted between the drive members.

2. The bicycle transmission according to claim 1, wherein the shifting structure includes a shifter arm that is arranged to move the mount member in the axial direction in response to pivotal movement of the shifter arm, the shifter arm including an actuated section configured and arranged to be moved in response to the manual operation by the rider of a control mechanism, and an engagement section configured and arranged to move the mount member in the axial direction on the axle.

3. The bicycle transmission according to claim 2, wherein the shifting structure further includes a collar slidably mounted on the axle to slide in the axial direction on the axle, and the shifter arm being operatively coupled to move the collar in the axial direction on the axle.

4. The bicycle transmission according to claim 3, wherein the shifting structure further includes a biasing member configured and arranged to urge the mount member in the axial direction on the axle towards one end of the axle.

5. The bicycle transmission according to claim 3, wherein the engagement section of the shifter arm includes a contact portion configured and arranged to contact the collar and move the collar in the axial direction on the axle.

6. The bicycle transmission according to claim 5, wherein the contact portion of the shifter arm is slidably engaged with the collar.

7. A bicycle transmission comprising:
an axle configured and arranged to rotate about an axis;
a mount member mounted on the axle to rotate together, the mount member being configured and arranged to receive a plurality of drive members operatively coupled to a rotatable driving member with an endless drive member; and
a shifting structure configured and arranged to move the mount member in the axial direction on the axle in response to a manual operation of a rider to selectively shift the mount member in an axial direction on the axle such that the endless drive member is selectively shifted between the drive members,
the shifting structure including a shifter arm that is arranged to move the mount member in the axial direction in response to pivotal movement of the shifter arm, the shifter arm including an actuated section configured and arranged to be moved in response to the manual operation by the rider of a control mechanism, and an engagement section configured and arranged to move the mount member in the axial direction on the axle
the actuated section of the shifter arm including a cable mounting arrangement.

8. A bicycle transmission comprising:
a support structure;
an axle rotatably supported by the support structure with at least one bearing to rotate about an axis;
a plurality of drive members mounted on the axle to rotate together, with one of the drive members being operatively coupled to a rotatable driving member with an endless drive member, the plurality of drive members mounted on the axle being enclosed in the support structure; and
a shifting structure configured and arranged to move the drive members in the axial direction on the axle in response to a manual operation of a rider to selectively shift the drive members in an axial direction on the axle such that the endless drive member is selectively shifted between the drive members.

9. The bicycle transmission according to claim 8, wherein
the shifting structure includes a shifter arm that is arranged to move the driving members in the axial direction in response to pivotal movement of the shifter arm, the shifter arm including an actuated section configured and arranged to be moved in response to the manual operation by the rider of a control mechanism, and an engagement section configured and arranged to move the driving members in the axial direction on the axle.

10. The bicycle transmission according to claim 9, wherein
the shifting structure further includes a collar slidably mounted on the axle to slide in the axial direction on the axle, and the shifter arm being operatively coupled to move the collar in the axial direction on the axle.

11. The bicycle transmission according to claim 10, wherein
the shifting structure further includes a biasing member configured and arranged to urge the drive members in the axial direction on the axle towards one end of the axle.

12. The bicycle transmission according to claim 10, wherein the engagement section of the shifter arm includes a contact portion configured and arranged to contact the collar and move the collar in the axial direction on the axle.

13. The bicycle transmission according to claim 12, wherein
the contact portion of the shifter arm slidably engaged with the collar.

14. The bicycle transmission according to claim 8, further comprising
a mount member configured and arranged to receive the plurality of drive members thereon.

15. A bicycle transmission comprising:
an axle configured and arranged to rotate about an axis;
a plurality of drive members mounted on the axle to rotate together, with one of the drive members being operatively coupled to a rotatable driving member with an endless drive member; and
a shifting structure configured and arranged to move the drive members in the axial direction on the axle in response to a manual operation of a rider to selectively shift the drive members in an axial direction on the axle such that the endless drive member is selectively shifted between the drive members,
the shifting structure including a shifter arm that is arranged to move the driving members in the axial direction in response to pivotal movement of the shifter arm, the shifter arm including an actuated section configured and arranged to be moved in response to the manual operation by the rider of a control mechanism, and an engagement section configured and arranged to move the driving members in the axial direction on the axle,
the actuated section of the shifter arm including a cable mounting arrangement.

16. A bicycle transmission system comprising:
a rotatable driving member configured and arranged to rotate about a first axis;
a rotatable driven member configured and arranged to rotate about a second axis;
an intermediate transmission operatively coupled between the rotatable driving member and the rotatable driven member, the intermediate transmission including
an axle,
a plurality of intermediate drive members configured and arranged to rotate the axle about a third axis offset from the first and second axes,
an endless drive member operatively coupled between the rotatable driving member and one of the intermediate drive members, and
a shifting structure configured and arranged to shift the intermediate drive members in an axial direction on the axle such that the endless drive member is selectively shifted between the intermediate drive members.

17. The bicycle transmission system according to claim 16, wherein
the shifting structure includes a shifter arm configured and arranged to move the intermediate drive members in the axial direction on the axle.

18. The bicycle transmission system according to claim 16, wherein
the shifting structure includes a biasing member configured and arranged to urge the intermediate drive members in the axial direction on the axle towards one end of the axle.

19. The bicycle transmission system according to claim 16, wherein
the rotatable driven member is fixedly mounted on the axle to rotate together.

20. The bicycle transmission system according to claim 16, wherein
the bicycle transmission is configured and arranged as a unit to be installed on a bicycle.

21. The bicycle transmission according to claim 16, wherein
the intermediate transmission is configured and arranged to substantially maintain the endless drive member moves in a single plane regardless of a position of the intermediate drive members relative to the endless drive member.

22. The bicycle transmission according to claim 16, wherein
the intermediate transmission includes a chain tensioner.

23. A bicycle transmission system comprising:
a rotatable driving member configured and arranged to rotate about a first axis;
a rotatable driven member configured and arranged to rotate about a second axis;
an intermediate transmission operatively coupled between the rotatable driving member and the rotatable driven member, the intermediate transmission including
an axle,
a plurality of intermediate drive members configured and arranged to rotate the axle,
an endless drive member operatively coupled between the rotatable driving member and one of the intermediate drive members, and
a shifting structure configured and arranged to shift the intermediate drive members in an axial direction on the axle such that the endless drive member is selectively shifted between the intermediate drive members, the shifting structure including a shifter arm configured and arranged to move the intermediate drive members in the axial direction on the axle,
the shifting structure further including a collar slideably mounted on the axle to slide in the axial direction on the axle, and the shifter arm being operatively coupled to move the collar in the axial direction on the axle.

24. The bicycle transmission system according to claim 23, wherein
the shifting structure further includes a biasing member configured and arranged to urge the intermediate drive members in the axial direction on the axle towards one end of the axle.

* * * * *